US006812822B1

(12) United States Patent
Spector

(10) Patent No.: US 6,812,822 B1
(45) **Date of Patent: *Nov. 2, 2004**

(54) COMBINED AUDIO/VIDEO MONITOR AND LIGHT BOX ASSEMBLY

(76) Inventor: Donald Spector, 380 Mountain Rd., Union City, NJ (US) 07087

(*) Notice: Subject to any disclaimer, the term of this patent is extended or adjusted under 35 U.S.C. 154(b) by 148 days.

This patent is subject to a terminal disclaimer.

(21) Appl. No.: 09/604,644

(22) Filed: Jun. 27, 2000

Related U.S. Application Data

(63) Continuation-in-part of application No. 09/065,732, filed on Apr. 24, 1998, now Pat. No. 6,084,527, which is a continuation-in-part of application No. 08/785,815, filed on Jan. 9, 1997, now Pat. No. 5,774,861.

(51) Int. Cl.[7] .......... G05B 23/02

(52) U.S. Cl. .......... 340/3.1; 340/5.61; 340/573.1; 340/573.2; 340/573.3; 340/573.4; 446/227; 704/275

(58) Field of Search .......... 340/3.1, 573.1, 340/573.2, 573.3, 573.4, 5.61; 704/275; 446/227

(56) References Cited

U.S. PATENT DOCUMENTS 5,446,934 A * 9/1995 Frazier .......... 5/655
6,084,527 A * 7/2000 Spector .......... 340/3.1

* cited by examiner

*Primary Examiner*—Ario Etienne
*Assistant Examiner*—Yves Dalencourt
(74) *Attorney, Agent, or Firm*—Collard & Roe, P.C.

(57) ABSTRACT

A combined monitor and display assembly at an infant location, and at a caregiver location. The apparatus includes a light box having a semi-reflective mirror behind which is a film transparency having a photographic image of the infant's mother. When a light bulb in the box is energized to illuminate the transparency, the image of the mother becomes visible to the infant. There is a sound-activated switching device connected between the bulb and a power source. The switching device, when activated by the infant's crying, remains activated for a predetermined period to energize the bulb and illuminate the transparency. There is a record playback unit having a stored voice message recorded by the mother, the unit being rendered operative when the bulb is energized. When the infant cries, it is presented with an image of its mother and hears her comforting message.

8 Claims, 2 Drawing Sheets

COMBINED AUDIO/VIDEO MONITOR AND LIGHT BOX ASSEMBLY

RELATED APPLICATIONS

This application is a C.I.P. of my applications Ser. No. 09/065,732 entitled "Combined Monitor and Light Box Assembly, filed Apr. 24, 1998, now U.S. Pat. No. 6,084,527, which in turn is C.I.P. of my application Ser. No. 08/785,815, filed Jan. 9, 1997, entitled "Mirror and Light Box Assembly with Mother's Image Display and Voice Playback Activated by Crying Infant"*now U.S. Pat. No. 5,774,861.

FIELD OF THE INVENTION

This invention relates generally to a light box assembly in which a light bulb within the box serves to illuminate a film transparency placed behind a semi-reflective mirror mounted on the face of the box whereby the transparency image is visible only when the bulb is energized, and more particularly to an assembly of this type which is installable in a crib occupied by an infant and is interactive with the infant, the assembly having incorporated therein an electronic monitor which transmits the image and sounds of the infant to a transceiver in the located proximate to the infant's caregiver.

STATUS OF PRIOR ART

It is known in the toy field to provide a "Magic Mirror"*in which placed behind a semi-reflective mirror is a light box covered by a film transparency. When an electric light bulb within the box is turned on to illuminate the transparency, a child looking at the mirror then does not see his own reflection, but the illuminated image, for the mirror is then effectively transparent.

Also included in a Magic Mirror toy is a sound unit which when the bulb on the light box is turned on, then reproduces recorded sounds appropriate to the image being presented. Thus, if the image is that of a dog, the reproduced sounds would be that of a dog barking.

Essential to a Magic Mirror and to an assembly in accordance with the invention is a mirror which in one mode of operation is effectively transparent and in another is effectively reflective. For this purpose, the mirror must be a semi-reflective mirror.

A conventional plane mirror is fabricated by evaporating a metallic film on the rear surface of a transparent plate made of glass or acrylic plastic material. In most mirrors, the reflecting film is aluminum which is deposited on a substrate by evaporation in vacuum. The advantage of aluminum is that it has a broad spectral band of high reflectivity. Almost all aluminum-coated mirrors are "overcoated" with a thin protective layer, such as a layer of magnesium fluoride.

While a conventional aluminum-coated mirror has an average reflectivity of close to 90 percent, mirrors are known whose coating imparts semi-reflective characteristics thereto. Thus, a beam impinging on a semi-reflective mirror is split into two parts, one begin transmitted through the mirror, the other being reflected thereby.

If therefore the face of a light box is covered by a semi-reflective mirror behind which is a film transparency, then when the box is dark, an observer looking into the mirror sees his own reflection. But if the box interior is illuminated, the observer then sees the image of the transparency, for the mirror is then operating in a light transmitting mode.

The concern of the present invention is with a light box and mirror assembly that is installable in a crib or other enclosure occupied by an infant, the assembly being interactive with the infant in a manner to be later explained.

The most difficult aspect of infancy from a mother's standpoint lies in the sleep habits of her infant. Whether an infant lying in a crib or other enclosure is able to sleep soundly depends on two factors, one being physical and the other psychological. The physical factor turns mainly on whether the infant is hungry or in pain, for in either case the infant will be unable to sleep and will cry out to attract its mother's attention. But many infants who are not disturbed physically, are unable to sleep soundly because they are in a state of anxiety.

An infant's existence centers on its mother, and a sense of security in regard to its mother is therefore essential to the infant's proper psychological equilibrium. All infant's however well cared for, remain anxious as to their mother's whereabouts. This insecurity does not vanish in later years, for many pre-school children carry security blankets to reduce anxiety.

The crib in which an infant lies is usually placed in the mother's bedroom or in a nursery adjacent this bedroom so that should the infant cry out, the mother will be aroused from sleep and attend to her baby. But whether in the course of a night the mother is awakened by her infant because the infant is physically uncomfortable or in a state of anxiety, in either event, the mother's sleep is interrupted. A mother's loss of sleep is perhaps the most exhausting aspect of raising an infant.

Of prior art interest is the patent to Zisholtz 4,640,034 which discloses a playback device activate by the sound of a crying child to play a recording of the mothers voice. It is also known to provide an electronic monitor to radio-transmit the sounds made by an infant in a crib to a receiver in the necessity of the infant's mother or caregiver.

The drawback of a conventional electronic monitor is that it does not discriminate between gurgling or playful sounds emanating from an infant and loud crying sounds. Hence, the mother at the receiving end of the monitor is continuously alerted to whatever sounds her infant makes rather than only to those sounds that reflect a disturbed state and therefore requires her attention.

SUMMARY OF THE INVENTION

In view of the foregoing, the main object of this invention is to provide a combined monitor and light box assembly installable in a crib or other enclosure occupied by an infant, which assembly is interactive with the infant.

More particularly, an object of this invention is to provide an assembly of the above type which in response to an infant's cries presents the infant with an image of its mother accompanied by her voice message, thereby assuring the infant of its mother's attention, the sounds and an image of the infant being transmitted to a transceiver that can be monitored by the mother.

A significant feature of the invention is that the assembly is customized for the particular infant to be comforted, for the image displayed by the assembly to the infant is that of his actual mother and the voice message it hears comes from the same mother. Hence the assembly functions as a virtual or surrogate mother.

Briefly stated, these objects are attained by a combined monitor and light box assembly installable in a crib or other enclosure occupied by an infant. The assembly which is interactive with the infant includes a light box on whose front face is mounted a semi-reflective mirror behind which is a film transparency having a photographic image of the infant's mother. When an electric light bulb n the box is energized to illuminate the transparency, the image of the mother becomes visible to the infant through the then effectively transparent mirror.

Associated with the light box is a sound-activated switching device connected between the bulb and a power source. The switching device, when activated by crying sounds emanating from the infant, remains activated for a predetermined period to energize the bulb and illuminate the transparency. Also associated with the light box is a record playback unit having stored therein a voice message recorded by the mother addressed to her infant, the unit being rendered operative only when the bulb is energized. Hence, when the infant cries, it is then presented with an image of its mother and at the same time it hears her comforting message, as a consequence of which the infant is induced to stop crying. The monitor which is operative only when the switch is activated, also transmits the image and the sounds then emanating from the infant to a receiver, which then can be viewed by its mother. The mother can then activate the pre-recorded sounds and/or talk to the infant. The sounds and image of the infant can also be transmitted over the Internet to mother located at a location different from that of the infant.

BRIEF DESCRIPTION OF DRAWING

For a better understanding of the invention as well as other objects and further features thereof, reference is made to the following detailed description to be read in conjunction with the accompanying drawings, wherein.

DESCRIPTION OF INVENTION

Figure 1:
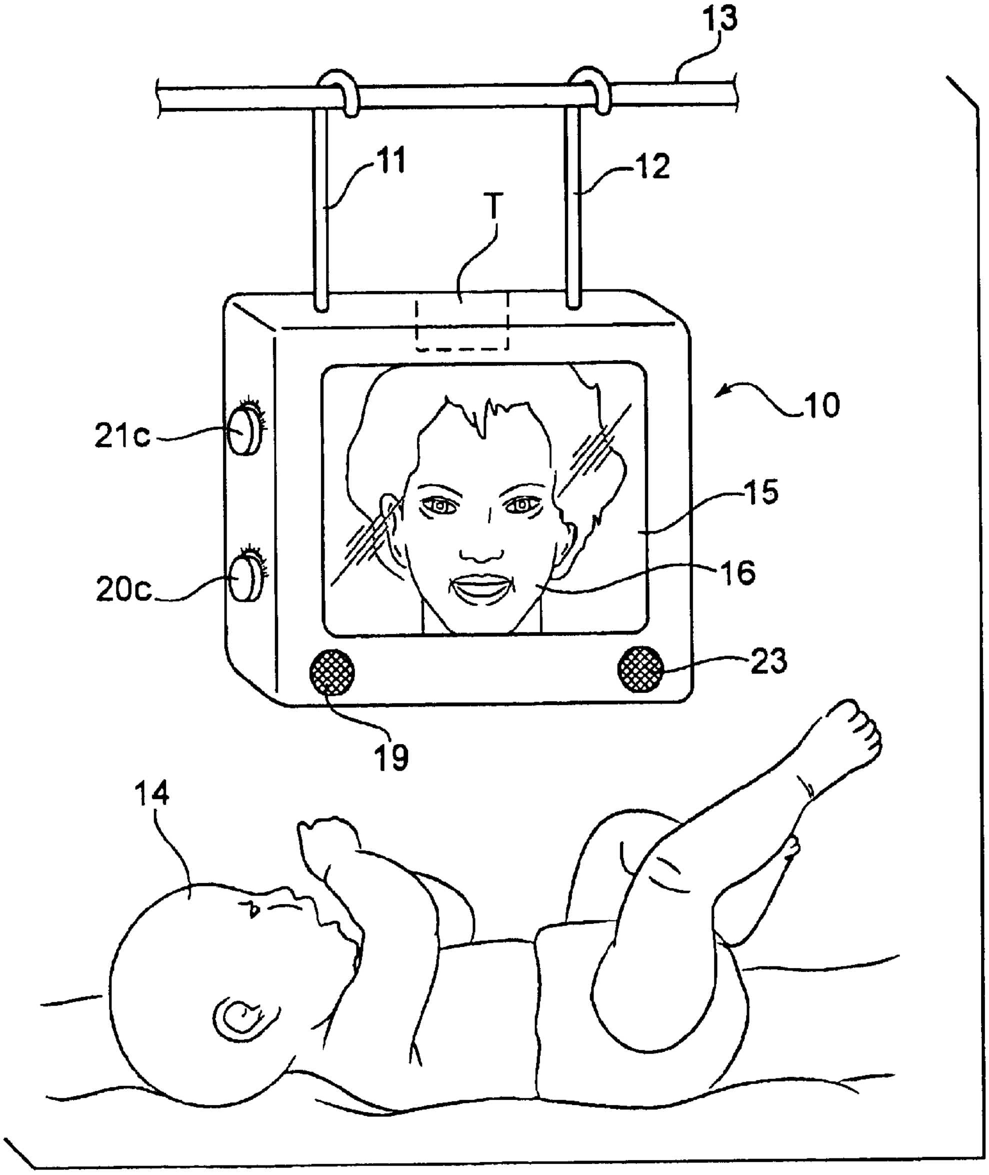
FIG. 1 shows a combined monitor and box assembly in accordance with the invention installed in a crib occupied by an infant.
Figure 2:
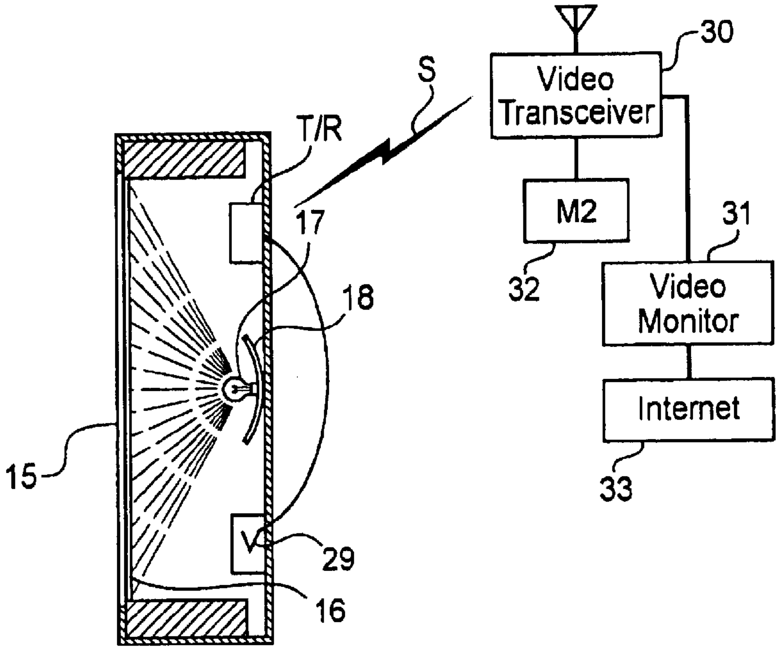
FIG. 2 is a section taken through the assembly.

Referring now to FIGS. 1 and 2, there is shown a combined monitor and light box and mirror assembly in accordance with the invention, generally identified by reference numeral 10. The assembly is provided with a pair of hooks 11 and 12 so that it can be suspended from a rail 13 or other horizontal structure on a crib or enclosure at a position where it can be seen by an infant 14 lying in the crib. In practice, the assembly exterior may be padded so as not to cause injury should the infant make physical contact therewith.

Mounted on the front face of the generally rectangular box 10 is a semi-reflective planar mirror 15. This mirror is preferably formed of a non-shatterable transparent acrylic plastic plate having a coating on its rear surface that renders the mirror semi-reflective.

Placed behind mirror 15 is a rectangular film transparency 16 containing a photographic image of the head of the mother of the infant for which the assembly is intended. The head of the mother is preferably in full scale so that when seen by the infant, the infant gains the impression that it is seeing its actual mother.

Mounted at the rear of box 10 is an electric light bulb 17 placed within a concave reflector 18 so that the rays radiating from the bulb are directed toward transparency 16. The bulb is preferably a low-voltage bulb so that it may be battery operated whereby the assembly is self-contained and need not be plugged into a power outlet. However, to obtain a greater light output, a high voltage electric bulb may be used. And to obtain uniform illumination of the transparency, a light diffusion plate may be placed behind the transparency.

When the light bulb is turned off, the box interior is dark and the semi-reflective mirror 16 then operates in a reflecting mode, for light impinging on its outer surface is reflected thereby. Hence should infant 14 then look into the mirror, the infant will see its own reflection. But when light bulb 17 is turned on, the light radiated by the bulb illuminates transparency 16 and what the infant then sees through the mirror then in a light transmitting mode, is an image of its own mother.

The arrangement is such that the assembly is activated only when the infant cries loudly, for should the infant just whimper or sob lightly, there is no need to activate the assembly. To this end, associated with the assembly is a sound-activated switching device that includes a microphone 19 placed in the front of box 10 adjacent its left side below mirror 15, to pick up sounds emanating from infant 14. The output of microphone 19 is connected through an adjustable threshold device 20 to an adjustable timer switch 21 which when operative, simultaneously closes switches $S_1$ and $S_2$ Threshold device 20 is an adjustable bias circuit that is set by the user of the assembly to activate timer switch 21 only when the sounds of the infant's crying as picked up by microphone 19 exceeds in amplitude a predetermined threshold level. Control knob 20C for threshold device 20 is on the side of the box, so that the user can set the threshold to a level appropriate to the infant, for some infant's are capable of crying much more loudly than others. For an infant whose loudest cries are relatively low amplitude, the threshold setting should be such as to activate the assembly when the amplitude of the cries is relatively low. For any given infant, the threshold setting must be such as to activate the assembly when the cries are loud for that infant, and not to activate the assembly when for that infant the cries are relatively soft.

The timing period of timer switch 21 is adjustable by a control 21C which is also on the side of the box so that the user can adjust the time duration to a period appropriate to the infant, say in a range of about 1 to 5 minutes. The duration during which the infant is presented with an image of its mother should be long enough to relieve the infant's anxiety as to the whereabouts of its mother. However, if at the end of the timed period, the infant is still crying, the timer switch 21 will be reactivated by these crying sounds.

When timer switch 21 is activated by the sounds of the infant to close switch $S_1$, this switch then connects light bulb 17 to a batter 22 or whatever other power source is used to energize the bulb. In practice instead of an incandescent bulb, use may be made of a battery-operated fluorescent bulb which for a given wattage produces a greater light output than an incandescent bulb of the same wattage.

Timer switch 21 closes switch $S_2$ at the same time it closes switch $S_1$. Switch $S_2$, when closed, activates a record play back unit associated with the assembly. The unit includes a miniature loud speaker 23 mounted on the front face of box 10 below the mirror on the right side.

The record playback unit has digitally stored in a Read-Only-Memory (ROM) 24 a series of short voice messages recorded by the mother of the infant. Hence the assembly must be tailored to whomever acquires the assembly, for the assembly must include a photographic transparency of the mother and a recording of her voice. The mother's message is intended to comfort her infant and preferably therefore should be a message which is already familiar to the infant from past experience. Thus, one message could be "hush-a-bye baby, go to sleep,"*another could be "Go to sleep, Go to sleep, Baby Go-to-Sleep"*and still another "it will be all right my baby, my baby it will be all right." The series of messages formulated by the mother are those she believes will be comforting to her baby.

Coupled to ROM 24 is a sequencer 25 which each time switch $S_2$ closes, then acts to read out from ROM 24 the next one in the series of recorded voice messages. Thus, if stored in the ROM are five brief voice messages and the previous messages read out was number five in the series, sequencer 23, when switch $S_2$ closes, will read out message number one. Thus, the same message is not repeated when the sound play back unit is activated, and the infant hears a message that is different from the one he heard before. It is important that the infant not gain the impression of a robot mother which would be the case where every time the infant cried he heard the same message from his mother.

The message read out of ROM 24 is converted into an analog signal by a digital-to-analog converter 26. This analog signal is amplified in an amplifier 27 whose output is applied to loudspeaker 23. All stages of the record play back unit can be integrated into a solid state circuit chip except for microphone 19. This unit is powered by battery 28.

Thus, when the infant in the crib cries loudly, then simultaneously activated for a predetermined period is the lighting system which illuminates the transparency image of the infant's mother and the record playback unit which yields the voice message of the mother. This audio-visual presentation assures the infant of its mother's concern and relieves the infant of whatever anxiety is disturbing its sleep.

But the assembly is not limited in its utility to a sleeping infant, for if the baby cries while awake, the assembly will be activated to comfort the child. And if the infant is being taken care of not by its mother, but by a nanny, nurse, or other caregiver, then the transparency will show that of the nanny or nurse, and the recorded voice will be of the same individual.

THE ELECTRONIC MONITOR

In order to alert the infant's mother or caregiver to a crib condition that requires attention, an electronic monitor is combined with the light box assembly. The monitor transmits from the crib a video picture and the sounds emanating from the infant, the transmission being intercepted by a portable receiver which can be monitored by the mother or caregiver at a site remote from the crib.

To this end, mounted within light box 10 is a miniature video camera 29 ("V") coupled to a battery-powered transmitter/receiver unit ("transceiver") T/R. Unit T/R is also coupled to a microphone 19 so that when the unit is turned it then transmits the crib sounds then being picked up by the microphone and the video image from camera 19. Video camera 29 may be of any suitable type including the readily available, inexpensive "web-cams"*which are sold for computer and Internet applications. Transceiver T/R may be a radio, infrared or a wired type of audio/video transmitter and receiver.

The drawback of a conventional electronic monitor is that it does not discriminate between gurgling or playful sounds emanating from an infant and loud crying sounds. Hence the mother at the receiving end of this monitor is continuously alerted to whatever sounds her infant makes, rather than only to those sounds that are indicated of a disturbed state and therefore requires her attention.

The period during which transceiver unit T/R is turned on need not be restricted to the period during which switch S3 is closed by timer switch 21. In practice, unit T/R can include a delay circuit which is triggered when switch S3 is closed to maintain the unit T/R in operation for a predetermined period, say 3 to 5 minutes.

The signal S transmitted by unit T/R is picked up by a audio video transceiver 30 connected to a video monitor 31 (VM), which is placed in the mother's bedroom or wherever else the mother or caregiver is located at the time the infant is lying in its crib. Transceiver 30 is inoperative when transmitter unit T/R is switched off, and only reproduces the sounds and image of the infant lying in the crib when the light box in the crib is activated. Video monitor 31 may be a separate video monitor or be the monitor of a standard personal computer.

In this way, should the mother be asleep in her bedroom, the mother will not be awakened by sounds emanating from her infant in the crib unless the sounds are such as to activate the light box, in which case the sounds are indicative of a disturbed state that requires the mother's attention.

Figure 3:
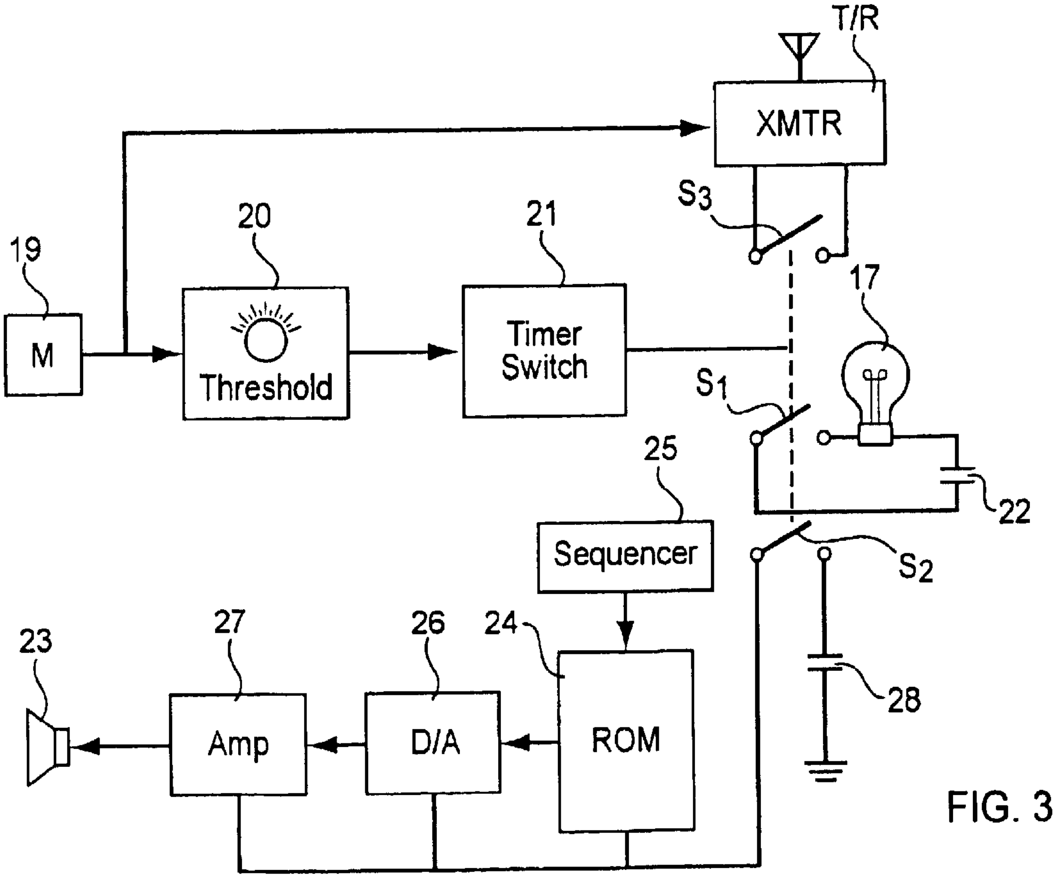
FIG. 3 is a block diagram of the sound-activated switching device, the record playback unit and the audio/video transmitter included in the assembly.

The image of the mother provided by the light box assembly and the recorded voice of the mother may be sufficient to quiet the infant; in which case there is no need for the mother to leave her bed. But it is only if the crying sounds which are heard over the monitor persist, that it then may become necessary for the mother to leave her bed to attend to her infant. Additionally, the caregiver or mother can also use transceiver 30 to transmit the caregivers or mothers voice back to the infant. Transceiver 30 is connected to a microphone 32 (M2), which can be of the type commonly supplied with personal computers, to pick up the mother or caregivers voice. It is seen in FIG. 3 that transceiver T/R at the light box is connected to amplifier 27 which in turn in connected to speaker 23 to allow the caregivers or mothers live voice to override the prerecorded message if the caregiver or mother deems it appropriate. Furthermore, the use of a personal computer as the monitoring device can enable the remote monitoring of the infant via the Internet which is schematically illustrated by block 33. This can occur if the mother, for example, is at work or otherwise away from the home. Of course a live caregiver, such as baby sitter, must he in close proximity to the infant the render assistance if necessary.

The invention has been described with respect to preferred embodiments. However, as those skilled in the art will recognize, modifications and variations in the specific details which have been described and illustrated may be resorted to without departing from the spirit and scope of the invention as defined in the appended claims.

I claim:

1. Apparatus installable in an enclosure occupied by an infant having a mother- said apparatus comprising:

A) means for displaying an image of the mother to the infant;

B) a record playback unit associated with the displaying means which when activated, reproduces a voice message recorded by the mother addressed to her infant;

C) a microphone and video camera associated with the displaying means to provide sounds generated by the infant and an image of the infant, D) an audio and video transmitter associated with the displaying means to transmit a signal from said microphone and said video camera that is intercepted by a video and audio monitor that can be heard and seen by the mother at a site remote from the enclosure; and E) means responsive to sounds of crying emanating from the infant to concurrently activate the displaying means, the playback unit and the audio and video transmitter whereby when the infant cries, it is then presented with and comforted by an image of its mother and her voice message, and the cries and image are transmitted and picked up by the monitor so that they are seen and heard by the mother.

2. Apparatus as set forth in claim 1, in which the enclosure is a crib, and the apparatus is provided with means to suspend said apparatus from a rail in said crib.

3. Apparatus as set forth in claim 2, wherein said activate means further includes a threshold device to enable said activate means only when the amplitude of the infant's cries exceed a predetermined threshold level.

4. Apparatus as set forth in claim 3, in which said threshold device includes setting means to adjust the threshold level.

5. Apparatus as set forth in claim 1, in which the voice message is reproduced by a loud speaker mounted within said apparatus.

6. Apparatus as set forth in claim 1, in which the audio and video transmitter is at least one of a radio transmitter and an infrared transmitter.

7. Apparatus as set forth in claim 1 in which the video and audio monitor is connected to the audio and visual transmitter over the Internet.

8. Apparatus as set forth in claim 1 further including means to permit the voice of the mother to be transmitted back to the audio and video monitor so as to override the voice message.

* * * * *